June 18, 1968 J. EHN 3,388,489
DISPLAY DEVICE FOR TRANSPARENCIES
Filed June 7, 1966 2 Sheets-Sheet 1

INVENTOR:
Jan Ehn,
BY
His Attorney.

June 18, 1968 J. EHN 3,388,489
DISPLAY DEVICE FOR TRANSPARENCIES
Filed June 7, 1966 2 Sheets-Sheet 2
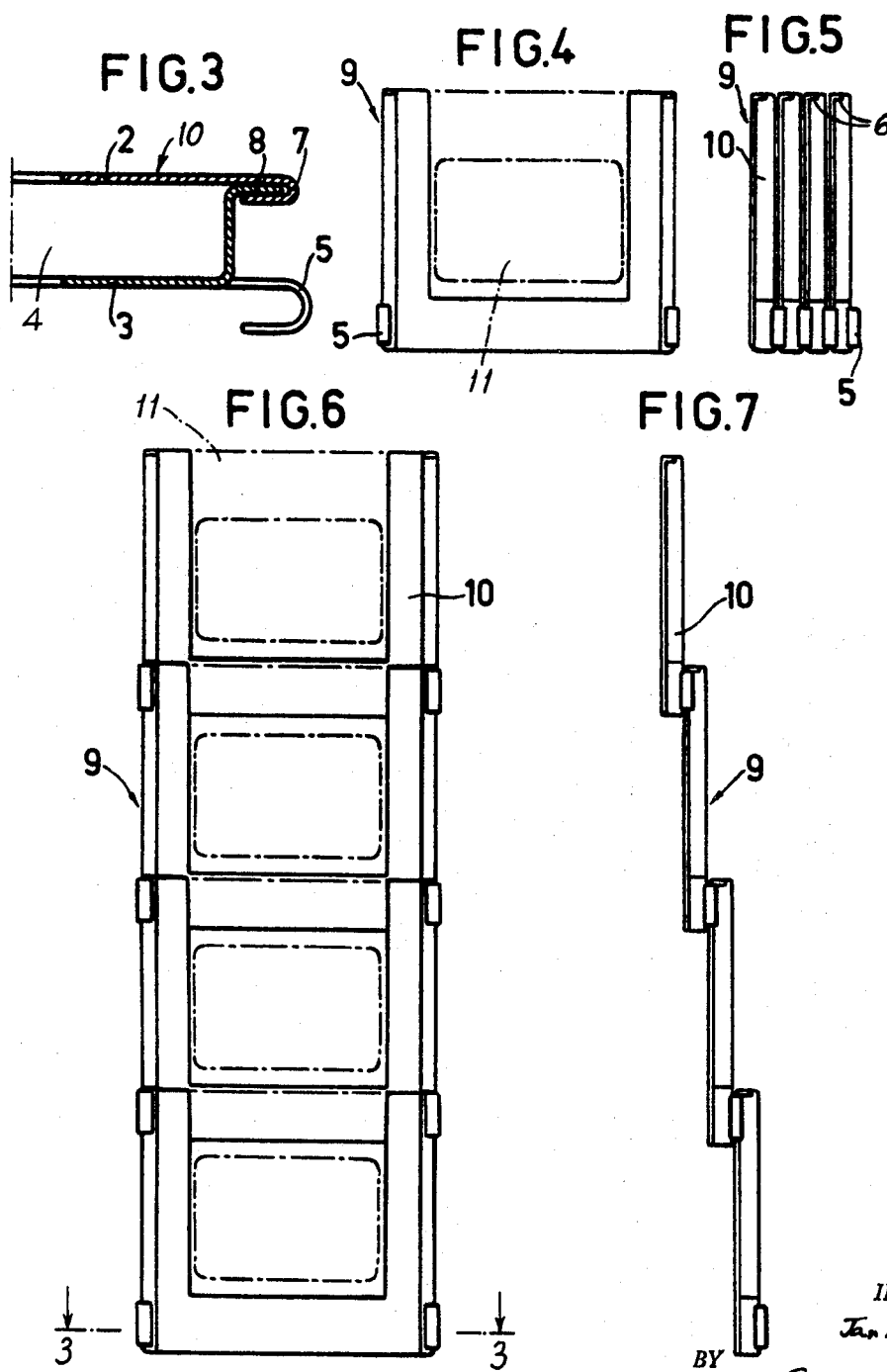

United States Patent Office 3,388,489
Patented June 18, 1968

3,388,489
DISPLAY DEVICE FOR TRANSPARENCIES
Jan Ehn, 9 Mastergatan, Osterbybruk, Sweden
Filed June 7, 1966, Ser. No. 555,906
Claims priority, application Sweden, June 10, 1965,
7,622/65
3 Claims. (Cl. 40—106.1)

ABSTRACT OF THE DISCLOSURE

A display device for transparencies has a series of interlinked frames wherein each frame is slideable relative to its adjacent front frame between an aligned position in which all the frames are stacked and fit into a storage box and, respectively, an extended chain position wherein all the frames are off-set from each other so that all the transparencies thereof are exposed to view simultaneously.

---

This invention relates to a device adapted for holding and displaying diapositives or photographic transparencies in a storage box and for displaying them outside the box.

In conventional arrangements for holding transparencies in a storage box and for displaying them, the box is provided with grooves of some type for fitting the transparencies therein. In order to recognize the different transparencies, they are usually individually marked or provided with text.

According to the invention a device for holding transparencies in a storage box is obtained which comprises a holding frame set adapted separately or together with additional holding frame sets to be kept in the storage box, the individual frames in the storage box being situated behind each other, but being slideable vertically relative to one another when the holding frame set is being lifted out of the box, in such a manner, that the holding frames form a chain, so that all of the transparencies collected in the frames can be looked at simultaneously.

The device according to the invention offers the substantial advantage, that the transparencies and their frames for placing them into or removing them from the storage box need not be handled individually, but can be handled several at a time, for example in series of 10 to 12 transparencies.

Due to the fact, that several frames are linked with each other, the transparencies are more distinctly arranged than heretofore, which is of particular interest when the transparencies are used for instruction purposes in schools and the like.

The device according to the invention offers the further advantage that the transparencies always assume the same position in the storage box, irrespective of how many times they are taken out of and placed into the box.

The storage boxes, besides, need not be provided with the aforementioned grooves, but may have a plane inner surface.

Figure 1:
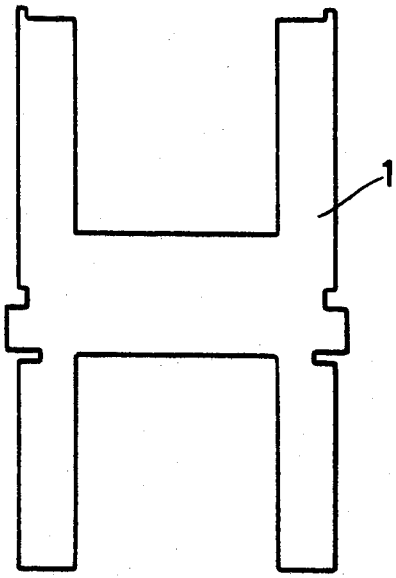
Figure 2:
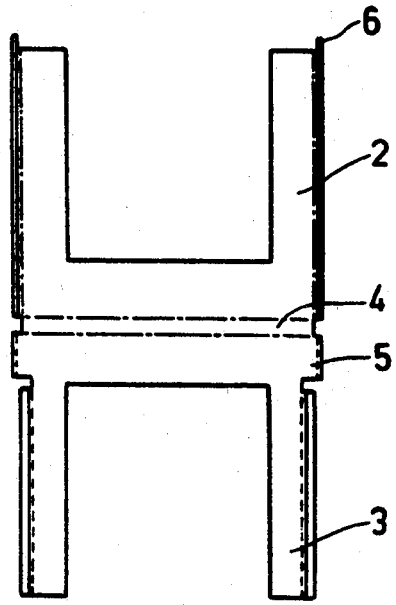

The invention is described in a greater detail in the following, reference being had to the accompanying drawings whereon FIG. 1 is a plan view of a plate punched out in a suitable manner for manufacturing a holding frame according to the invention, FIG. 2 is a plan view of the plate as illustrated in FIG. 1 and the bending of its different details, FIG. 3 is a large scale fragmentary sectional view of the holding frame according to the invention, taken on the line 3—3 of FIG. 6, FIG. 4 is a front elevational view of a series of a holding frames in the aligned position according to the invention, FIG. 5 is a side elevational view of the series of holding frames in the aligned position according to FIG. 3, FIG. 6 is a front elevational view similar to FIG. 4 with the holding frames being shifted relative each other into the extended position, FIG. 7 is a side elevational view similar to FIG. 5 but showing the holding frames in the extended position as in FIG. 6.

In FIGS. 1 and 2 the different details of a sheet metal plate 1 made, for example, of aluminum are shown before and after its edges were bent. The dash-dotted lines in FIG. 2 indicate the final bending for obtaining the U-shaped holding frame 10 according to the invention, which frame 10 can be linked with additional holding frames 10 in a series 9 of frames. The portion designated by 2 constitutes the back piece of the completed holding frame for a transparency 11, the portion designated by 3 its front piece, and the portion 4 its base. 5 designated a cam means such as a hook at the front piece.

FIG. 3 shows on an enlarged scale and in detail how the bending of the individual edge portions was carried out. Only one half of the holding frame is shown. The lateral edge 7 of the back piece 2 was bent about the lateral edge 8 of the front piece 3 in such a manner, that a suitable distance for holding the transparency 11 was obtained between the front piece 3 and the back piece 2. In FIG. 3 also the bending of the hook 5 is shown in a clear manner.

The complete holding frame 10 is linked together with other frames 10 a frame series 9. The hook 5 is inserted from above over the bent lateral edge 7 of another holding frame 10 in front and engages the lateral edge 7 thereof slidingly. The lateral edge 7 thus forms a cam engaging means for the cam means namely the hook 5. Thereafter, the tip 6 is bent down in such a manner, that the holding frames remain linked together and cannot be separated from each other. Each hook 5 of each frame 10 in the series 9 engages slidingly the lateral edge 7 of the frame 10 in front thereof, so that the frames 10 can be moved, by vertical sliding, relative to each other between the aligned position (FIGS. 4, 5) and the extended position (FIGS. 6, 7). In the aligned position, the series 9 of frame 10 can be put into a storage box (not shown). The series of frames can be lifted out of the storage box by lifting the holding frame located farthest to the rear in the said series, whereby the series will be placed into the extended position as shown in FIGS. 6 and 7.

The holding frame series according to the invention, instead of being made of sheet metal plate, can also be manufactured of cast synthetic plastics or the like.

In certain projectors special magazines for transparencies are now used to a great extent. The holding frame series according to the invention is well adapted for use also in such arrangement. The special magazine (not shown) is threaded in known manner over the transparencies in the holding frames and an angular iron or the like is preferably placed at one lower edge of the holding frame set for stabilizing the same.

Further modifications of the device are imaginable within the scope of the invention.

What I claim is:
1. A display device, for use in connection with a storage box for transparencies, comprising a series of interlinked frames, each frame being slideable relative to its adjoining frames and including a channel structure adapted to hold a transparency, two lateral substantially straight cam means, two cam engaging means operable to engage in sliding relation the cam means of one of the next adjoining frames forming therewith a pair, said cam means and cam engaging means of said pair of adjoining frames guiding the adjoining frames of said pair between two opposite extreme positions relative to each other, whereby when all of said frames are in one extreme position all the frames will be aligned substantially parallel in a stack-like manner and said series of frames will be adapted to fit into said box and, respectively, when all the frames relative to their adjoining frames have been slid into the other extreme position, all of the frames of the series will be in an extended position forming a chain in which the frames are off-set from each other and wherein all the transparencies thereof are adapted to be exposed to view simultaneously.

2. A display device, as claimed in claim 1, said cam means including two lateral edges, and said cam engaging means including two hooks, the hooks of one frame engaging slidingly, for vertical shifting, the lateral edges of the frame in front thereof.

3. A display device, as claimed in claim 1, each frame being formed of one blank and having a front portion, a rear portion and a base therebetween, said cam engaging means being disposed close to said base and engaging the cam means of the frame immediately in front thereof, whereby said series of frames may be moved to the extended position by lifting the rearmost frame of said series out of the aligned position until all of said frames will be in the extended position.

References Cited
UNITED STATES PATENTS

| | | | |
|---|---|---|---|
| 2,228,378 | 1/1941 | Whitcomb | 40—102 |
| 2,643,474 | 6/1953 | Grenot | 40—102 |
| 2,816,379 | 12/1957 | Ensor | 40—106.1 |

EUGENE R. CAPOZIO, *Primary Examiner.*

W. J. CONTRERAS, *Examiner.*